Aug. 16, 1938.  L. W. WILLIAMS ET AL  2,126,938
FILTER
Filed Aug. 7, 1936  3 Sheets-Sheet 1
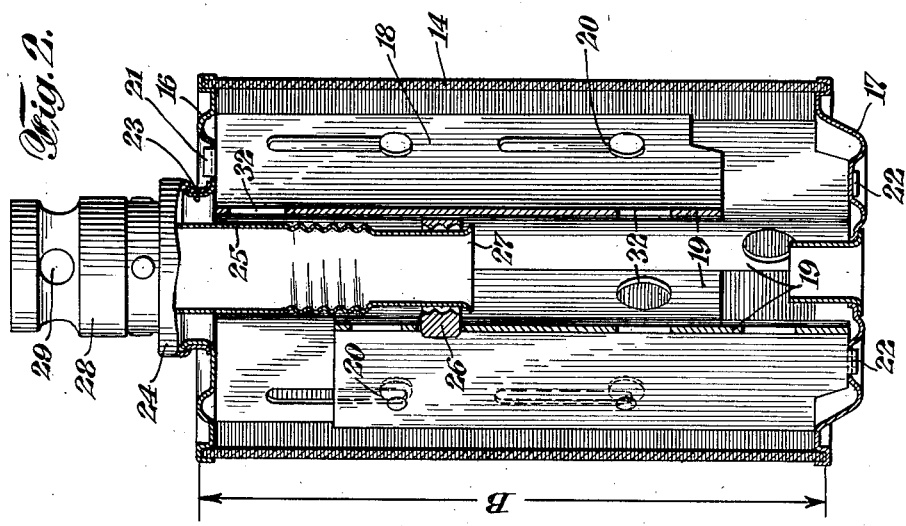
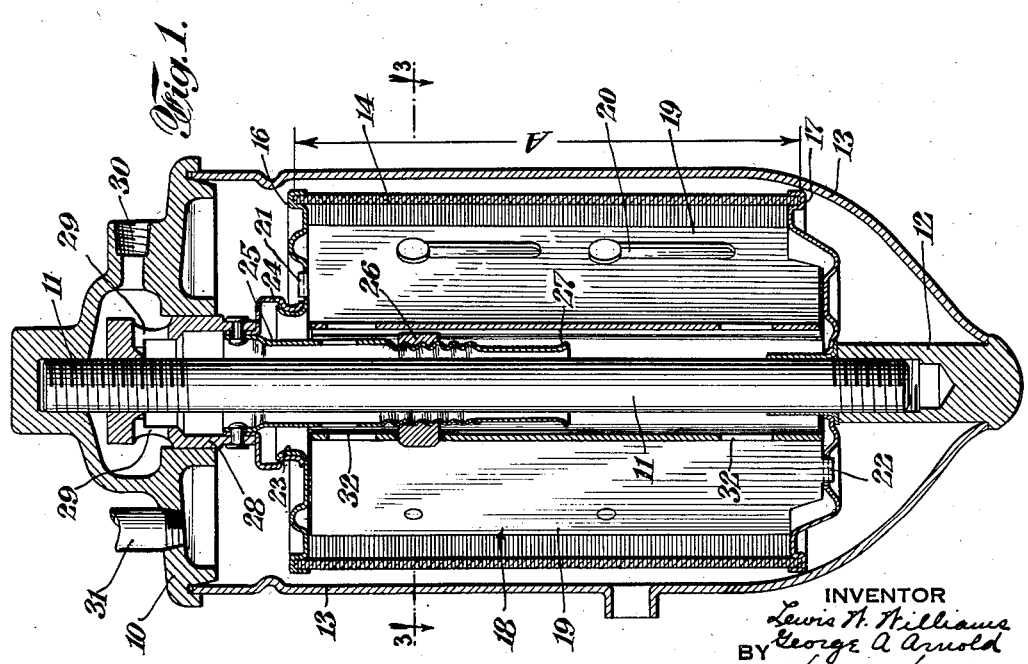
INVENTOR
Lewis W. Williams
George A. Arnold
BY
Kenyon & Kenyon
ATTORNEYS Aug. 16, 1938.   L. W. WILLIAMS ET AL   2,126,938
FILTER
Filed Aug. 7, 1936    3 Sheets-Sheet 2
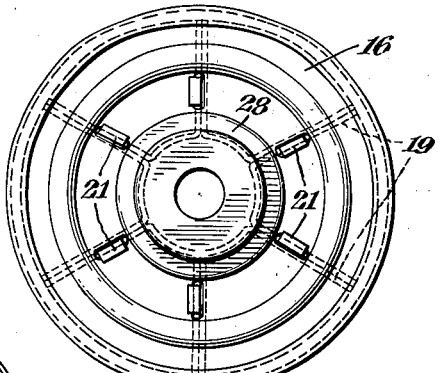
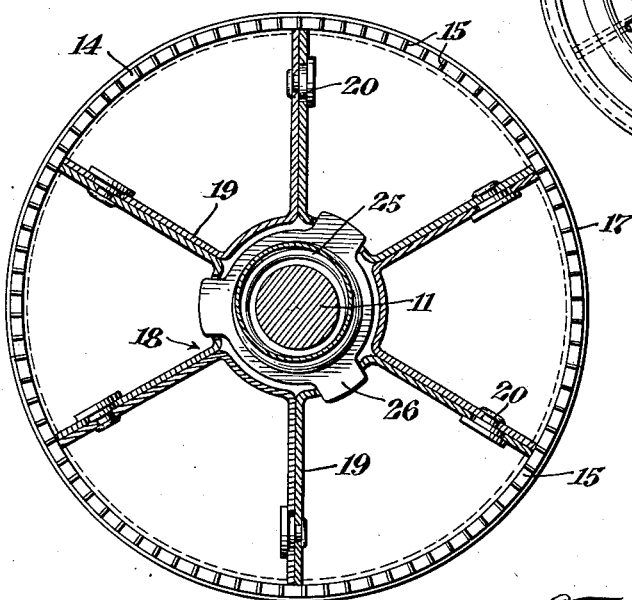
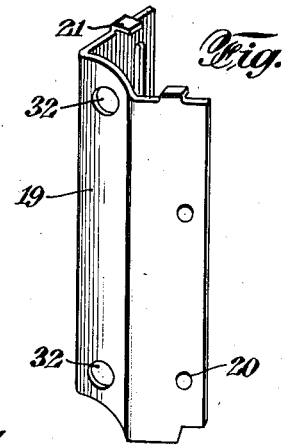
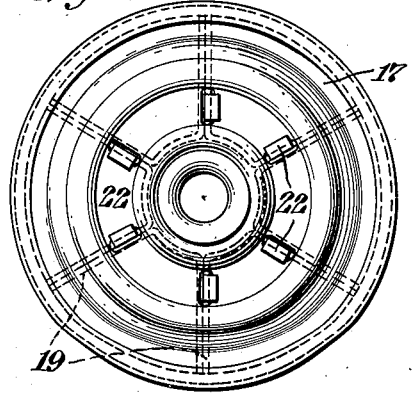
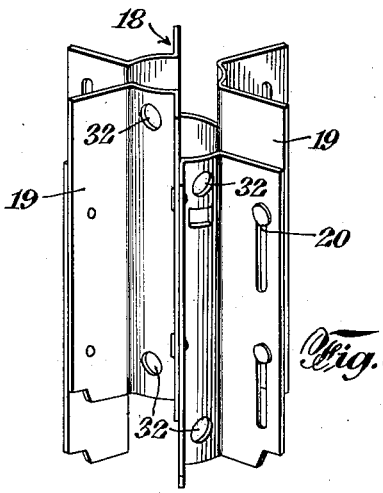

Aug. 16, 1938.   L. W. WILLIAMS ET AL   2,126,938
FILTER
Filed Aug. 7, 1936    3 Sheets-Sheet 3
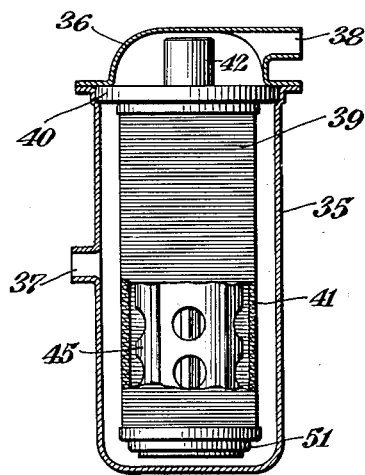
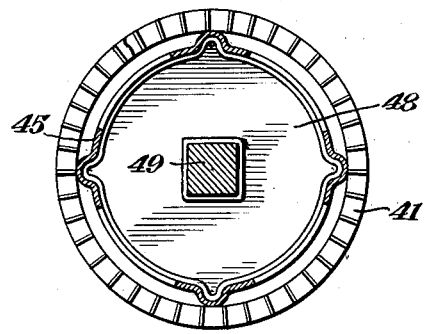
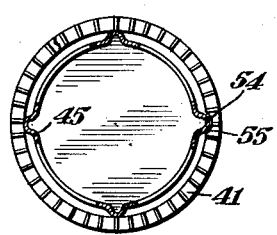
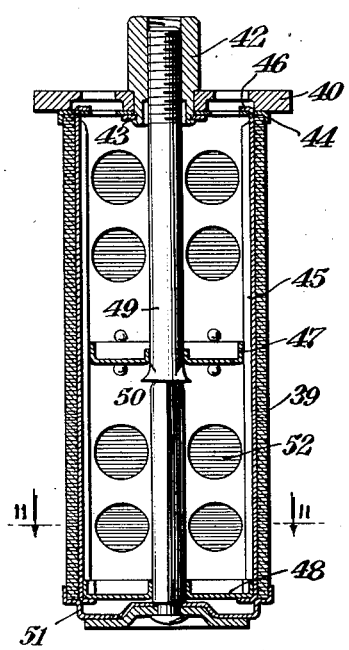
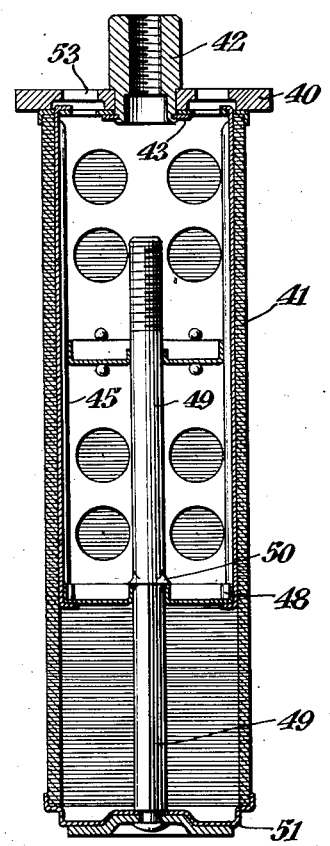
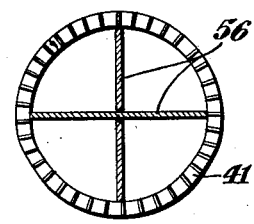
INVENTOR
Lewis W. Williams
George A. Arnold
BY
Kenyon & Kenyon
ATTORNEYS Patented Aug. 16, 1938

2,126,938

UNITED STATES PATENT OFFICE 2,126,938

FILTER

Lewis W. Williams, Short Hills, and George A. Arnold, Chatham, N. J., assignors to Motor Improvements, Inc., Newark, N. J., a corporation of Delaware Application August 7, 1936, Serial No. 94,748

9 Claims. (Cl. 210—167)

This invention relates to filters and more especially to a filter having the filtering element composed of metal.

In the patent to Liddell, No. 2,042,537, there is disclosed a filtering element composed of a helix of thin metal ribbon with contacting turns, the filtering interstices being provided by transverse ribs formed on one face of the ribbon. Such a filter element is practically indestructible, but after a period of use, the interstices may become clogged and the efficiency of the filtering unit thereby impaired. Solids contained in the interstices may be removed by separating the turns of the helix and wiping or brushing the ribbon and it is an object of this invention to facilitate the separation of the turns for cleaning purposes.

In filters embodying the invention, the helix is slidably mounted on a frame and the ends of the helix are closed by caps mounted on the frame, at least one of which is capable of movement axially of the frame. Means are provided for effecting movement of said cap and for locking it in position with the helix clamped between both caps. The caps normally hold the turns of the helix in contact one with another to render the helix serviceable as a filtering element but may be moved apart to permit stretching of the adjacent turns of the helix to render the surfaces of the ribbon accessible for cleaning purposes. Preferably, the caps are provided with circular grooves for receiving the ends of the helix to form sealed joints between the caps and the helix. Also, interacting means may be provided on the frame and helix for preventing rotation of the helix and limiting movement of the turns in a direction axially of the frame.

Other objects, novel features and advantages of this invention will become apparent from the following specification and accompanying drawings, wherein:

Fig. 1 is a section through a filter containing a filtering element embodying the invention, the filtering element being in operating condition;

Fig. 2 is a section through the filtering element shown in Fig. 1, the filtering element being in condition for cleaning;

Fig. 3 is a section on the line 3—3 of Fig. 1;

Fig. 4 is a top view of the filtering element;

Fig. 5 is a bottom view of the filtering element;

Fig. 6 is a perspective view of the support for the wire helix;

Fig. 7 is a perspective view of one of the members of which the support is composed;

Fig. 8 is a section through a filter having another form of filtering element embodying the invention;

Fig. 9 is a section through the filtering element of Fig. 8 with the filtering element in operating condition;

Fig. 10 is a view similar to Fig. 9 but with the filtering element in position for cleaning;

Fig. 11 is a section on the line 11—11 of Fig. 9;

Fig. 12 is a view similar to Fig. 11 showing a modified form of supporting element, and Fig. 13 is a view similar to Fig. 12 showing a still further modification of the supporting member.

Referring now to Figs. 1 to 6 inclusive, a base 10 carries a stud 11 and a nut 12 is screwed on to the end of the stud. A casing 13 is clamped against the head 10 by the nut 12, a portion of which extends through one end of the casing. The casing with the head forms a container for the filtering element. The filtering element 14 consists of a helix of thin metal ribbon with contacting turns, the filtering interstices being provided with transverse metal ribs 15, such filtering element being fully disclosed in Liddell Patent No. 2,042,537. The ends of the filtering element are received in circular grooves provided in the heads 16 and 17 and the turns of the helix are supported by an extensible frame 18. This frame 18 is composed of six similar members 19 each having a central arcuate portion and a pair of wing portions each normal to the arcuate portion. The arcuate portion of each member 19 is of such length that when six of these members are assembled with their wings in contact, the arcuate portions form a cylinder and the wings form radial vanes. As shown in Fig. 6, the six members 19 are slidably attached to each other by pin and slot connections 20. Three of the members 19 are connected to the head 16 by tongues 21 while the remaining three are connected to the head 17 by tongues 22. The members 19 connected to the head 16 alternate with the members 19 connected to the head 17 and the arrangement is such that the heads are capable of limited relative movement toward and away from each other with the wings at all times providing contiruous vane edges engageable by the filtering helix. The cap 16 is provided with a central aperture having an upstanding flange 23 on which is rotatably supported a sleeve 24. A second sleeve 25 of smaller diameter than the sleeve 24 is attached thereto and extends into the circular passageway of the frame 18. This sleeve is screw-threaded over a portion of its length and cooperates with a nut 26 supported by the three members 19 which are attached to the cap 17. The lower end of the sleeve 25 is of sufficiently small diameter to slide through the nut 26 but is provided with a flange 27 of larger diameter than the interior diameter of said nut. Both of the sleeves 24 and 25 are attached to a ring 28 which is seated in the base 10 and is provided with radial apertures 29 communicating with an outlet 30 through the base 10. The frame 18 and the filtering element supported thereby, together with the sleeve 28 is slidably mounted on the post 11 so that upon removal of the casing 13 the filtering unit may be removed fom the head 10.

The filtering unit is shown in operating condition in Fig. 1. In such condition the turns of the helix are clamped in contact by the heads 16 and 17 which are held in clamping relation by the screw-threaded engagement between the sleeve 25 and the nut 26. Oil to be filtered is supplied to the container through the inlet 31, passes inwardly through the filtering interstices and through the apertures 32 in the frame 18 into the central bore of the frame. From thence it passes through the space between the sleeve 25 and the post 11 and is discharged by way of the apertures 29 to the outlet 30.

When it is desired to clean the filtering unit, the nut 12 is unscrewed from the post 11, thereby permitting removal of the casing 13 and the filtering element is slid over the post 11. Next, the sleeve 24 is rotated to disengage the threaded portion of the sleeve 25 from the nut 26. During the unscrewing of the sleeve from the nut, the sections 19 slide on each other, thereby moving apart the heads 16 and 17. Further sliding of the parts 19 and further movement apart of the heads 16 and 17 is permitted to the extent of the length of the slots in the members 19 and the position of the flange 27. With the heads 16 and 17 thus moved apart, the turns of the helix may be separated sufficiently to facilitate cleaning of the ribbon by wiping or brushing.

In the embodiment disclosed in Figs. 8 to 13 inclusive, 35 is a casing having a removable cover 36. The casing is provided with an inlet 37 and the cover is provided with an outlet 38. A filtering unit 39 is supported within the casing 35 by a disk-like head 40 which rests on a shoulder formed in the casing wall and divides the container formed by the casing and head into inlet and outlet sections.

The filtering unit comprises a filtering element 41 consisting of a helix of thin metal ribbon with contacting turns, the filtering interstices being provided by transverse ribs formed on one face of the ribbon. A stud 42 has a portion of reduced diameter extending through a central aperture in the head 40 and carrying a ring 43 which rotatably clamps a cap 44 to the under face of the head 40. A fluted metal drum 45 is attached at one end to the cap 44 by tongues 46 and constitutes a support for the filtering element 39. Approximately centrally of the cylinder 45 is arranged a guide member 47 having a central aperture and at the end of the cylinder is provided a second guide member 48 having a central aperture of square cross-section. A rod 49 extends through the apertures in the guide members 47 and 48 and at its upper end is provided with screw threads adapted to be received in a screw-threaded bore of the stud 42 which is rotatable with respect to the cap 44. On the rod 49 are provided stops 50 which limit the outward movement of the rod and the rod is square in cross-section from the stops 50 to its lower end. To the lower end of the rod 49 is attached a cap 51.

In Fig. 9, the filtering unit is shown in its operating condition with its turns held in contact and the caps 44 and 51 clamped against the ends of the helix by reason of the screw-threaded engagement of the upper end of the rod 49 and the stud 42. Oil to be filtered is introduced through the inlet 37, passes inwardly through the interstices in the filtering helix, through the apertures 52 and into the interior of the cylinder 45. The filtered oil then passes out through the apertures 53 in the cap 44 and head 40 into the head 36 from which it is discharged through the outlet 18.

When it is desired to clean the filter, the rod 49 is released from the stud 42 by rotation of the latter, after which the cap 51 is moved away from the cap 44 until the stops 50 engage the guide 48. The rod 49 is held against rotation by reason of its square cross-section and the square cross-section of the aperture in the guide 48. With the caps in the position shown in Fig. 10, the turns of the helix may be separated sufficiently to clean the same by wiping or brushing. The filtering element is returned to its operating condition merely by pushing the cap 51 toward the cap 44 until the end of the rod 49 engages the recess in the lower end of the stud 42 whereupon the latter is rotated to draw the caps into clamped relation.

In the modification disclosed in Fig. 12, one of the flutes 54 of the cylinder 45 is slightly larger than the remainder and the inner surface of the helix is grooved as at 55 to receive the flute 54, thereby preventing rotation of the helix and limiting the turns of the helix to longitudinal movement when the helix is spread out for cleaning purposes. This arrangement prevents any change in the size of the interior diameter of the helix by rotation of the turns of the helix.

In the modification disclosed in Fig. 13, the supporting frame for the filtering helix comprises a pair of plates 56, each centrally slotted throughout approximately half its length to permit assembly into the arrangement shown.

It is, of course, to be understood that other structural forms of supporting members also lie within the contemplation of this invention.

We claim:

1. In a filter, a helix of thin metal ribbon having contacting turns, a support on which said helix is supported with adjacent turns free to slide on said frame out of contact with each other, caps at either end of said frame for closing the ends of said helix, one of said caps being movable relative to the other to permit separation of the turns of said helix, and inter-engaging means on said frame and helix to prevent relative rotation thereof.

2. In a filter, a helix of thin metal ribbon having contacting turns, a frame on which said helix is supported with adjacent turns free to slide on said frame out of contact with each other, a cap fixed to one end of said frame, a second cap supported by said frame for movement toward and away from said first cap, said caps being adapted to close the ends of said helix, means for locking said caps against the ends of said helix, and inter-engaging means on said frame and helix to prevent relative rotation thereof.

3. In a filter, a helix of thin metal ribbon having contacting turns, a frame on which said helix is supported with adjacent turns free to slide on said frame out of contact with each other, a cap fixed to one end of said frame, a guide rod slidably supported by said frame, a second cap carried by said guide rod at one end, means on said frame for locking said rod with the caps engaging the end of said helix, and inter-engaging means on said frame and helix to prevent relative rotation thereof.

4. In a filter, a helix of thin metal ribbon having contacting turns, a two-part frame on which said helix is supported with adjacent turns free to slide on said frame out of contact with each other, means slidably connecting said parts, caps at the ends of said frame for closing the ends of said helix, and means for effecting relative movement of said parts and locking said frame with the caps engaging the ends of said helix.

5. In a filter, a helix of thin metal ribbon having contacting turns, a two-part frame on which said helix is supported with adjacent turns free to slide on said frame out of contact with each other, a cap fixed to each portion and being adapted to close the corresponding end of said helix, and means for effecting relative movement of said parts and locking said elements with said helix clamped between said caps.

6. In a filter, a helix of thin metal ribbon having contacting turns, a frame on which said helix is slidably mounted, said frame consisting of two portions, and means for slidably connecting said portions, a cap fixed to each portion and being adapted to close the corresponding end of said helix, a nut connected to one frame portion and a screw connected to the other frame portion and constituting means for effecting relative movement of said frame portions and locking the same with the helix clamped between said caps.

7. In a filter, a helix of thin metal ribbon having contacting turns, a frame on which said helix is supported with adjacent turns free to slide on said frame out of contact with each other, said frame being composed of two portions, and means slidably connecting said portions, a cap carried by each portion and being adapted to close one end of said helix, a nut connected to one frame portion, and a screw rotatably supported by the other frame portion, said screw and nut cooperating to effect relative movement of said frame portions into and out of position with the helix clamped between said caps.

8. In a filter, a helix of thin metal ribbon having contacting turns, a frame on which said helix is supported with adjacent turns free to slide on said frame out of contact with each other, said frame having an axial bore and consisting of two portions, means slidably connecting said portions, a cap carried by each frame portion and being adapted to close one end of said helix, a nut carried by one frame portion and being arranged in said bore, and a hollow screw rotatably supported by the cap for the other frame portion, said hollow screw and nut being cooperative to effect movement of the frame portions into position with the helix clamped between said caps.

9. In a filter, a helix of thin metal ribbon having contacting turns, a frame on which said helix is supported with adjacent turns free to slide on said frame out of contact with each other, a cap fixed to one end of said frame, a nut rotatably mounted in said cap, a guide rod slidably supported by said frame for reciprocation only and having one end threaded for co-operation with said nut, a second cap carried by said guide rod, and inter-engaging means on said guide rod and frame for limiting movement of the rod relative to the frame, said caps being engageable with the ends of the helix to close the same and one cap having a passage communicating with the interior of the helix.

LEWIS W. WILLIAMS.
GEORGE A. ARNOLD.